(12) United States Patent
Polonsky (10) Patent No.: US 8,290,258 B1
(45) Date of Patent: Oct. 16, 2012

(54) METHOD, DEVICE AND COMPUTER PROGRAM PRODUCT FOR PERFORMING A COLOR BASED WHITE BALANCE OF A DIGITAL IMAGE

(75) Inventor: Shlomo Polonsky, Modi'in (IL)

(73) Assignee: Pixim Israel Ltd., Ra'anana (IL)

( * ) Notice: Subject to any disclaimer, the term of this patent is extended or adjusted under 35 U.S.C. 154(b) by 1154 days.

(21) Appl. No.: 12/122,698

(22) Filed: May 18, 2008

(51) Int. Cl.
*G06K 9/00* (2006.01)

(52) U.S. Cl. ......... 382/167; 345/690; 358/1.9; 358/3.02

(58) Field of Classification Search .................. 382/167; 345/690; 358/1.9, 3.02
See application file for complete search history.

(56) References Cited

U.S. PATENT DOCUMENTS

| | | | |
|---|---|---|---|
| 5,448,502 A * | 9/1995 | Kindo et al. .................. | 382/165 |
| 6,411,331 B1 * | 6/2002 | Sansom-Wai et al. ..... | 348/223.1 |
| 2002/0163529 A1 * | 11/2002 | Evanicky ....................... | 345/600 |
| 2004/0095478 A1 * | 5/2004 | Takano et al. .............. | 348/223.1 |
| 2008/0259400 A1 * | 10/2008 | Hersch et al. .................. | 358/2.1 |

* cited by examiner

*Primary Examiner* — Chan S Park
*Assistant Examiner* — Eueng-Nan Yeh
(74) *Attorney, Agent, or Firm* — Reches Patents (57) ABSTRACT

A method for performing a color based white balance of a digital image, the method includes: generating or receiving multiple chromaticity value pairs of multiple pixel areas of the digital image; finding selected candidates; wherein a selected candidate represents a pixel area and has a chromaticity value pair that falls within at least one color gamut out of a group of color gamut of different colors; wherein the different colors comprise at least one color that differs from gray; calculating at least one white balance compensation parameter in response to pixel information of pixels areas that have selected chromaticity values; and providing a compensated digital image by applying at least one white balance compensated image.

14 Claims, 9 Drawing Sheets

METHOD, DEVICE AND COMPUTER PROGRAM PRODUCT FOR PERFORMING A COLOR BASED WHITE BALANCE OF A DIGITAL IMAGE

RELATED APPLICATIONS

This application incorporates by reference US patent application titled "Method, device and computer program product for performing white balancing of a digital image" and US application titled "Method, device and computer program product for performing a gamut based white balance of a digital image", all being concurrently filed in the United States of America.

BACKGROUND OF THE INVENTION

1. Field of the Invention

The invention relates to the field of digital color image processing and especially to white balancing of a digital image.

2. Description of the Prior Art

The human eye can adjust to varying illumination conditions. Digital images should undergo a compensation process that is known as white balancing in order to adjust digital images to varying illumination conditions. This process is referred to as white balancing because its goal is to represent white objects as white, despite the illumination conditions.

Some prior art white balancing methods are highly complex and require computational resources that are available only in costly hardware, other prior art methods process the whole digital image and are time consuming. Various prior art methods and systems for white balancing are described in the following patents and patent applications, all being incorporated herein by reference: U.S. Pat. No. 7,151,563 of Masayu, U.S. Pat. No. 6,873,727 of Lopez et al., U.S. Pat. No. 7,006,135 of Ishimaru et al., and U.S. Pat. No. 6,839,088 of Dicarlo et al.

One prior art white balancing method involves looking for pixels that can be attributed to an illumination of a gray object. This includes looking only into pixels that fall within an oriented gray gamut. This oriented gray color gamut is usually a hull convex polygon that is tilted in relation to the horizon. It is noted that these pixels can result from imaging one or more gray objects under certain lighting conditions as well as from imaging non-gray objects under other lighting conditions.

The reliability of the abovementioned prior art white balancing method is strongly dependent upon a number of pixels within the tilted gray gamut and to the colors of the imaged objects. A low reliability can be obtained if, for example, most or all of the imaged objects are not gray and, additionally or alternatively, if due to illumination conditions there are few pixels that fall in the oriented gray gamut.

There is a growing need to provide a robust and reliable white balancing method, device, and computer program product.

SUMMARY OF THE INVENTION

A method for performing a color based white balance of a digital image, the method includes: generating or receiving multiple chromaticity value pairs of multiple pixel areas of the digital image; finding selected candidates; wherein a selected candidate represents a pixel area and has a chromaticity value pair that falls within at least one color gamut out of a group of color gamut of different colors; wherein the different colors comprise at least one color that differs from gray; calculating at least one white balance compensation parameter in response to pixel information of pixels areas that have selected chromaticity values; and providing a compensated digital image by applying at least one white balance compensated parameter.

A device having color gamut based white balancing capabilities, the device comprises a processor and a memory unit; wherein the memory unit stores the digital picture; wherein the processor is adapted to: (i) generate or receive multiple chromaticity value pairs of multiple pixel areas of the digital image; (ii) find selected candidates; wherein a selected candidate represents a pixel area and has a chromaticity value pair that falls within at least one color gamut out of a group of color gamut of different colors; wherein the different colors comprise at least one color that differs from gray; (iii) calculate at least one white balance compensation parameter in response to pixel information of pixels areas that have selected chromaticity values; and (iv) provide a compensated digital image by applying at least one white balance compensated parameter.

A computer program product the comprises a tangible computer readable medium that stores code that once executed by a computer causes the computer to: (i) generate or receive multiple chromaticity value pairs of multiple pixel areas of the digital image; (ii) find selected candidates; wherein a selected candidate represents a pixel area and has a chromaticity value pair that falls within at least one color gamut out of a group of color gamut of different colors; wherein the different colors comprise at least one color that differs from gray; (iii) calculate at least one white balance compensation parameter in response to pixel information of pixels areas that have selected chromaticity values; and (iv) provide a compensated digital image by applying at least one white balance compensated parameter.

DETAILED DESCRIPTION OF THE DRAWINGS

A white balancing method, device and computer program product are provided. Multiple color gamuts are utilized.

These color gamuts can include gray gamut and at least one non-gray gamut. For example, three different color gamuts, five different color gamuts and even more color gamuts can be used. The non-gray colors can be selected in various manners. For example, a combination of blue gamut, green gamut, skin tone gamut, and gray gamut can be used.

Multiple areas of digital pixels are represented by candidates that have a pair of chromaticity values that are calculated from color information of these areas of pixels. A selection process selects candidates that have chromaticity values that are located within any of these color gamuts.

A candidate is an information unit that represents color information of a pixel area. It has a pair of chromaticity values. It is termed candidate because is can affect the white balancing process or can be ignored of.

After the selection process ends, at least one white balance compensation parameter is calculated in response to selected candidates.

At least one white balance compensation parameter can be used to provide a compensated digital image.

By using multiple color gamuts of different colors, the number of candidates (and hence pixel areas) that are taken into account increases.

Candidates that have their chromaticity values in proximity to a color gamut but outside the color gamut can also be taken into account—resulting in a further increment of the number of "relevant" candidates.

Furthermore, by utilizing multiple color gamuts of different colors the white balancing process is less sensitive to that color which is dominant in the digital image.

The white balancing is simplified by processing chromaticity values of candidates, especially when the number of the candidates is much smaller than the number of pixels of the digital image.

Conveniently, the white balancing is further simplified generating chromaticity values within a chromaticity space in which a black body line is horizontal.

Figure 6:
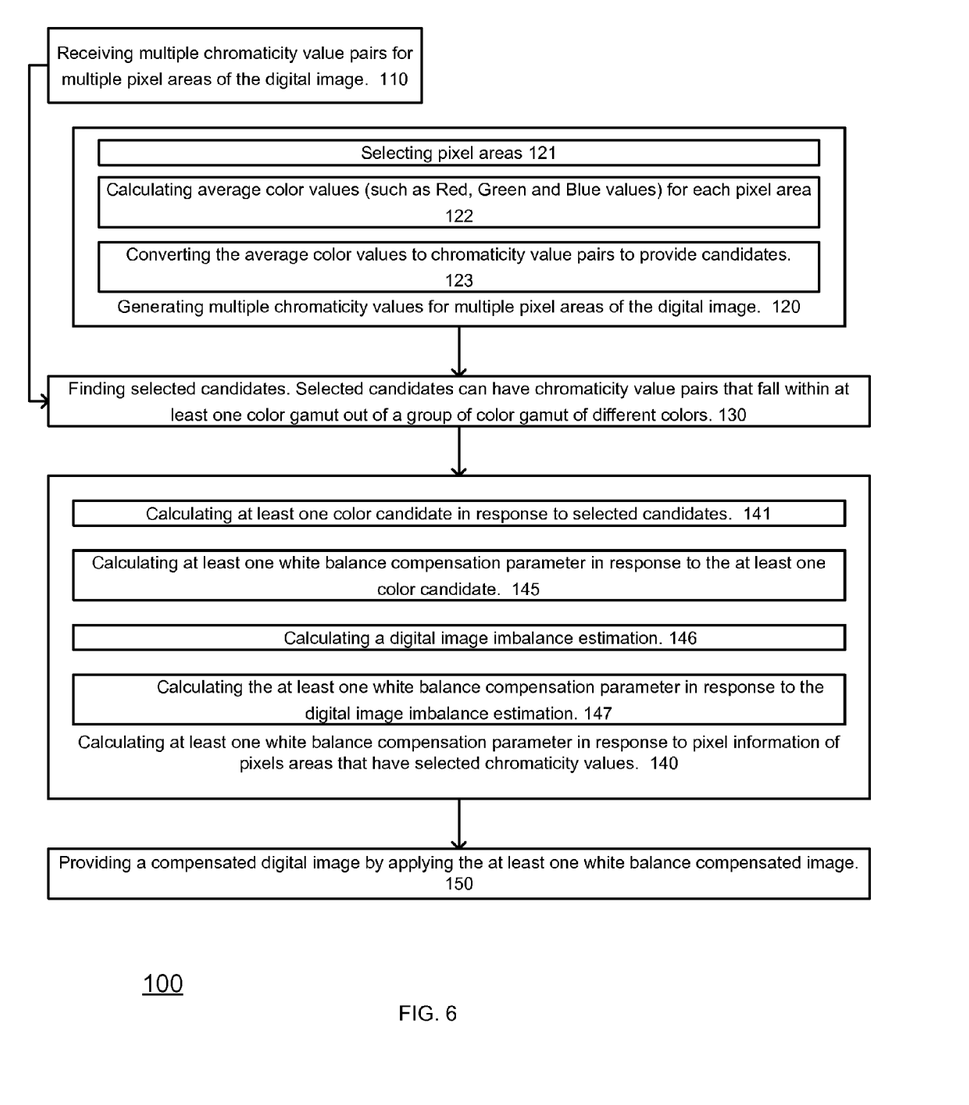
FIG. 6 is a flow chart of a method according to an embodiment of the invention.

FIG. 6 illustrates method 100 according to an embodiment of the invention.

Method 100 starts by stage 110 or 120.

Stage 110 includes receiving multiple chromaticity value pairs for multiple pixel areas of the digital image. Stage 110 includes receiving multiple candidates.

Stage 120 includes generating multiple chromaticity values for multiple pixel areas of the digital image. Stage 120 includes generating candidates.

Stage 120 can include at least one of the following stages or a combination thereof: (i) stage 121 of selecting pixel areas; (ii) stage 122 of calculating average color values (such as Red, Green and Blue values) for each pixel area; and (iii) stage 123 of converting the average color values to chromaticity value pairs to provide candidates. The chromaticity values of the candidates can be within a chromaticity space in which a black body line is horizontal but this is not necessarily so.

Figure 1:
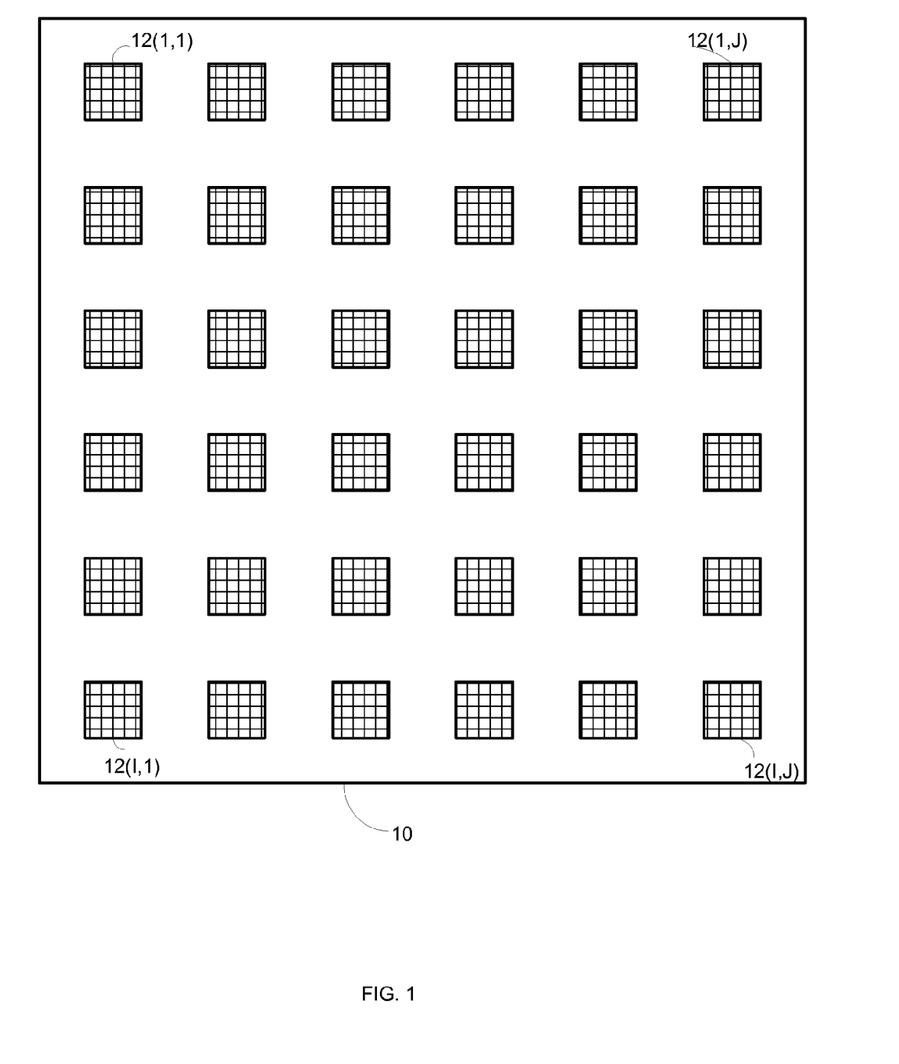
FIG. 1 illustrates a digital image and multiple pixel areas according to an embodiment of the invention.

FIG. 1 illustrates digital image 10 and multiple pixel areas 12(1,1)-12(I,J) according to an embodiment of the invention.

Indices I and J are positive integers. FIG. 1 is out of scale and the pixels within all the pixel areas can be only a small fraction of the overall pixels of digital image 10. A pixel area and the number of pixel areas can be relatively small. For example, the number of pixel areas can be 8×8, 10×10, 16×12, 20×20, and the like, and the number of pixels per pixel area can include, for example, 2×2, 4×4, 8×8, 10×10 pixels and the like.

The pixel areas can be a square shape but this is not necessarily so. The pixel areas can spread in a homogenous manner but this not necessarily so. For example, pixel areas can be spread over the complete digital image or mostly located in one or more portions (for example a central portion) of digital image 10.

Each pixel area (for example 12(i,j)) is represented by a pair of chromaticity values x'(i,j) and y'(i,j). These chromaticity values can be calculated by: (i) calculating, for that pixel area, average colors values $R(i,j)$, $B(i,j)$, $G(i,j)$, wherein these average color values can be arithmetic mean, geometric mean, weighted averages and the like; (ii) converting these average color values to a pair of chromaticity values x' and y':

$$x'(i,j) = x(i,j) \cdot \cos \alpha + y(i,j) \cdot \sin \alpha,$$

$$y'(i,j) = -x(i,j) \cdot \sin \alpha + y(i,j) \cdot \cos \alpha,$$

Wherein:

$$x(i,j) = \frac{G(i,j) \cdot B(i,j)}{R(i,j) \cdot G(i,j) + G(i,j) \cdot B(i,j) + R(i,j) \cdot B(i,j)},$$

$$y(i,j) = \frac{G(i,j) \cdot R(i,j)}{R(i,j) \cdot G(i,j) + G(i,j) \cdot B(i,j) + R(i,j) \cdot B(i,j)}, \text{ and}$$

$\alpha$ is the angle between a black body line and an x-axis of an R/G, B/G space, before the black body line is rotated.

Figure 2A:
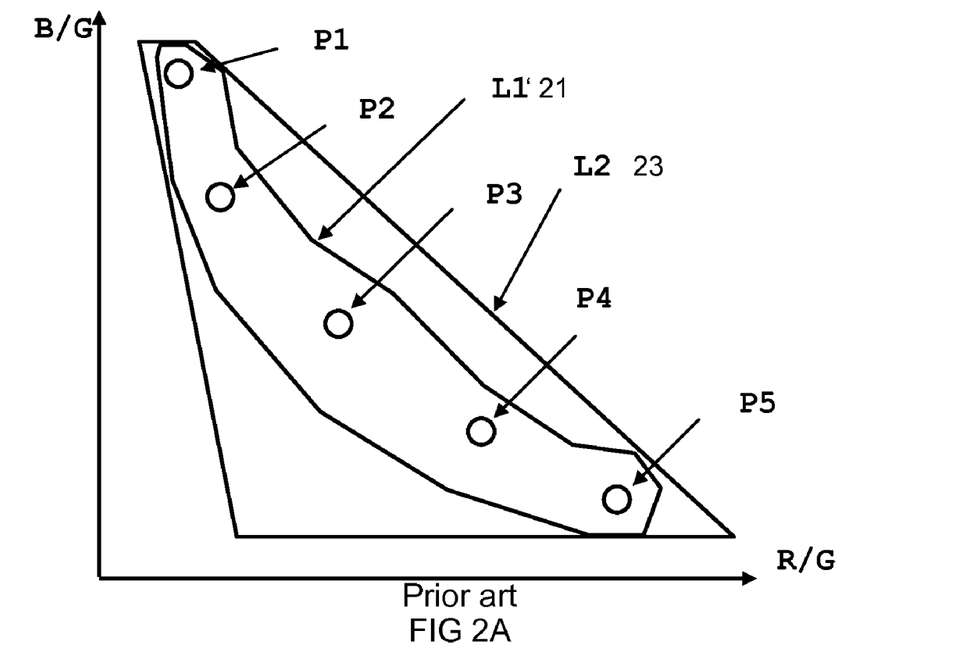
FIG. 2A illustrates a prior art (R/G, B/G) space and gray gamuts.

FIG. 2A illustrates a prior art (R/G, B/G) space that in which L1' 21 is a gray polygon that is not linear. Its shape complicates the determination of whether a pair of R/G, B/G values is within the polygon or not. Due to this complexity it was suggested to replace L1' 21 by trapezoid L2 23. It is noted that trapezoid L2 23 is much larger than L1, 21 and using it results in significant inaccuracies.

Figure 2B:
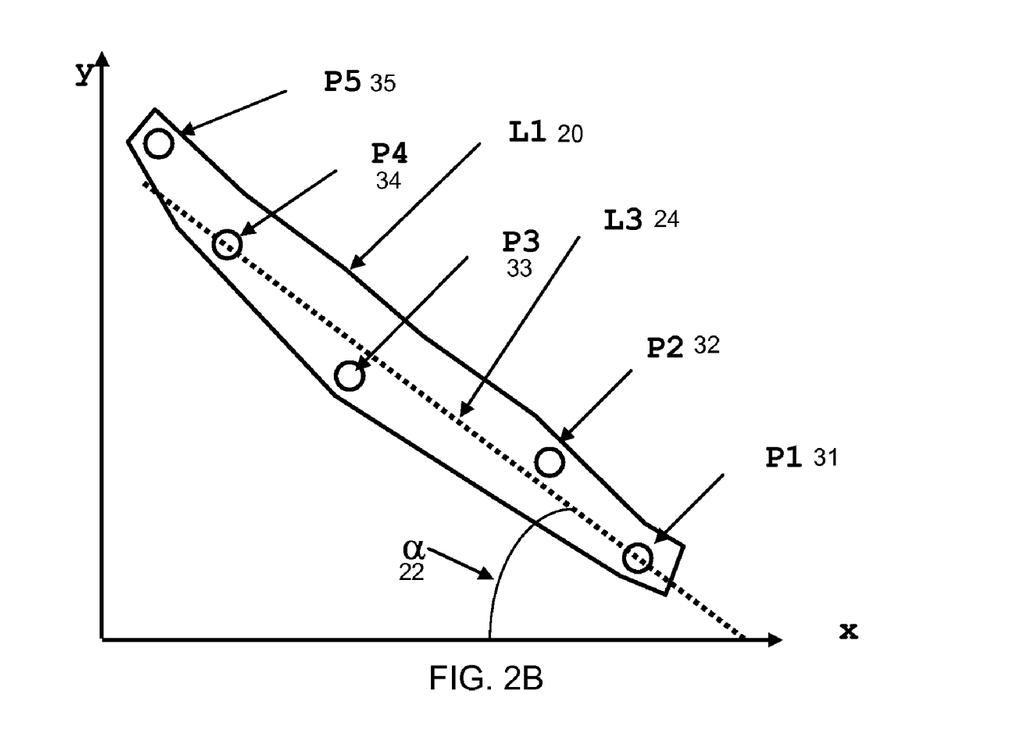
FIG. 2B illustrates an oriented gray gamut and a black body line, according to an embodiment of the invention.

FIG. 2B illustrates an oriented gray gamut L1 20 and a black body line L3 24 that is oriented at angle $\alpha$ 22 in relation to an x-axis of a chromaticity space (x,y), according to an embodiment of the invention.

The rotated chromaticity space has several advantages over the prior art (R/G, B/G) space: (i) The (R/G, B/G) space is very non-linear in a sense that black-body locus is close to hyperbola, and the gray candidates region has a half-moon shape (not-convex!). As s result, the calculations (whether the candidate is inside the region, distance to the region etc) are complex, or the simplified region is very inaccurate; (ii) the inverse space (G/R, G/B) is not uniform (the ends are stretched too much, because of the possibly small values in the denominator); (iii) the space of gains (x, y) where x=WR/(WR+WG+WB), y=WB/(WR+WG+WB) includes an oriented black body, which complicates geometric calculations, wherein WR represents red color components, WG represents green color components and WB represents Blue color components, (iv) The rotated chromaticity space is close to linear, more uniform, allows usage of Euclidian geometry with better results, and as the gray region is a narrow band oriented horizontally, it simplifies calculations significantly.

Figure 3:
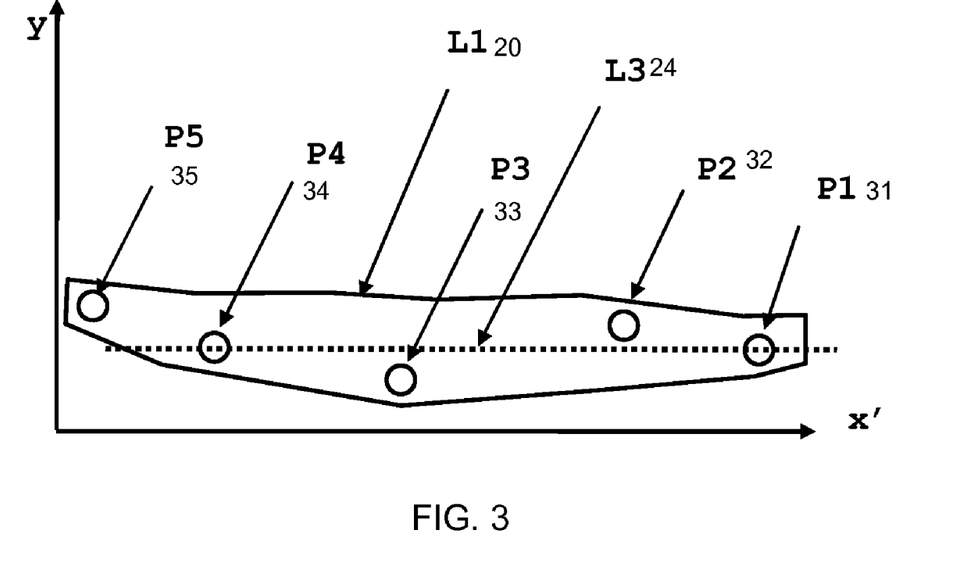
FIG. 3 illustrates multiple points, a gray gamut and a horizontal black body line after being rotated, according to an embodiment of the invention.

Points P1 31, P2 32, P3 33, P4 34, and P5 35 have chromaticity value pairs that correspond to a typical daylight gray point, a typical daylight or fluorescent illumination gray point, a typical cool white fluorescent illumination gray point, a typical incandescent illumination gray point, and a typical warm white fluorescent illumination gray point. FIG. 3 illustrates points P1-P5 31-35, gray gamut L1 20, and horizontal black body line L3 24 after being rotated by $\alpha$ 22, according to an embodiment of the invention.

Using a chromaticity space simplifies the calculation as even in an oriented format the gray polygons are more linear than the polygons of the R/G, B/G space. The rotation further simplifies the calculation of a spatial relationship between gray gamut L2 20 (and portions of that gamut that can be associated with different illumination conditions) and various chromaticity value pairs that of pixel areas. The same applies to non-gray color gamuts.

Referring back to FIG. 6, stages 110 and 120 are followed by stage 130 of finding selected candidates. According to an embodiment of the invention, selected candidates have chromaticity value pairs that fall within at least one color gamut out of a group of color gamut of different colors.

These different colors can include at least one of the following: (i) gray and at least one color that differs from gray; (ii) gray and at least two colors that differs from gray; (iii) gray and at least two colors out of skin tine, green and sky-blue; or (iv) multiple colors that differ from gray.

Figure 4:
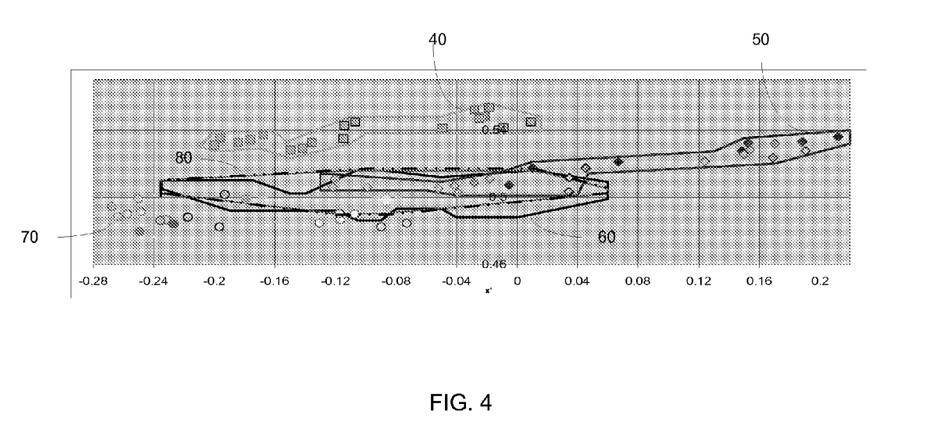
FIG. 4 illustrates five color gamuts and multiple candidates according to an embodiment of the invention.

FIG. 4 illustrates five color gamuts—green gamut 40, blue gamut 50, gray gamut 60, yellow gamut 70, and skin tone gamut 80 according to an embodiment of the invention. FIG. 4 also illustrates multiple candidates. These gamuts can be generated by illuminating a Macbeth chart by different illumination conditions, during a calibration process, and determining the X' and Y' chromaticity ranges of each color.

According to another embodiment of the invention, selected candidates can also have chromaticity value pairs that fall outside a color gamut (out of color gamuts 40, 50, 60, 70 and 80) but are proximate to the color gamut. Conveniently, the weight assigned to such candidates are different to (usually lower) the weight assigned to candidates that their chromaticity value pairs fall within the color gamut. A weight can be inversely proportional to the distance between the color gamut and the candidate but this is not necessarily so. For example, the weight can be a non-linear function of that distance, or can be a function that is not responsive to that distance. These weights are taken into account when a color candidate is calculated.

Referring back to FIG. 6, stage 130 is followed by stage 140 of calculating at least one white balance compensation parameter in response to pixel information of pixels areas that have selected chromaticity values.

Stage 140 can include stages 141 and stage 145. Stage 141 is followed by stage 145.

Stage 141 includes calculating at least one color candidate in response to selected candidates.

Stage 141 can include calculating a color candidate for each color gamut or calculating a single color candidate that is responsive to selected candidates of different color gamuts.

A color candidate of a certain color gamut can be a weighted sum of the chromaticity value pairs of the selected candidates that their chromaticity value pair fall inside the color gamut and optionally also of selected candidates that their chromaticity value pair fall outside the color gamut but in proximity to the color gamut.

Figure 7:
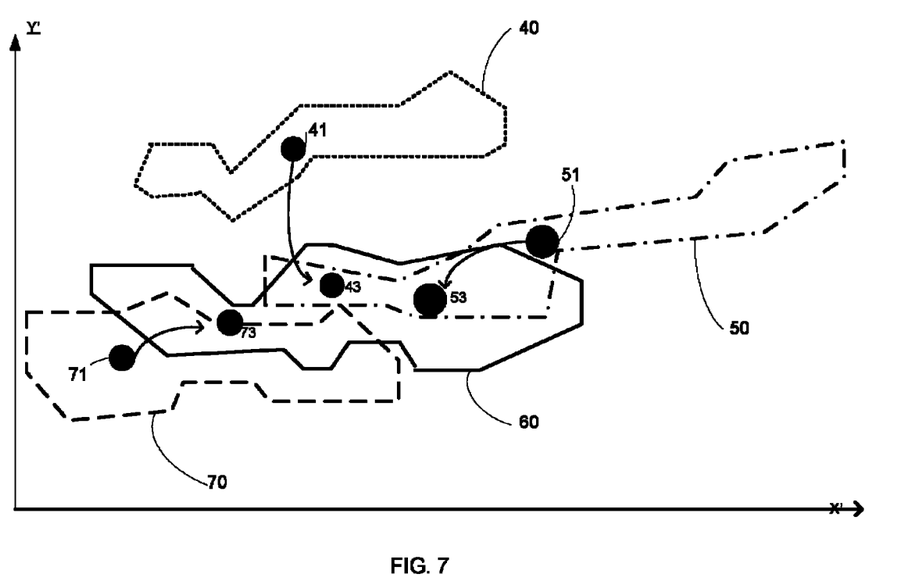
FIG. 7 illustrates multiple color gamuts and various color candidates, according to an embodiment of the invention.

Referring to FIG. 4, up to five color candidates can be calculated—a green candidate, a blue candidate, a gray candidate, a yellow candidate, and a skin tone candidate. Referring to FIG. 7, yellow candidate 71, blue candidate 51, and green candidate 41 are calculated.

Stage 145 includes calculating at least one white balance compensation parameter in response to at least one color candidate.

Stage 145 can include stages 146 and 147.

Stage 146 includes calculating a digital image imbalance estimation.

Assuming that there are multiple color candidates then the digital image imbalance estimation can be a weighted sum of the different color candidates.

Stage 146 can include mapping all non-gray candidates towards the vicinity of the gray gamut to provide multiple mapped candidates. Referring to the example set forth in FIG. 7, yellow candidate 71 is mapped to mapped yellow candidate 73, blue candidate 51 is mapped to mapped blue candidate 53, and green candidate 41 is mapped to mapped green candidate 43.

The mapping can involve applying a mapping function between each color gamut to the gray gamut.

The mapping function can be a bi-linear mapping function having coefficients (a1, b1, c1, a2, b2, and c2) that are determined in advance (for example, during a calibration stage). An example of such a function is illustrated below:

$$x'_{gray} = a_1 x'_{color} + b_1 y'_{color} + c_1$$

$$y'_{gray} = a_2 x'_{color} + b_2 y'_{color} + c_2$$

It is noted that other mapping functions (including non-linear mapping functions, higher power mapping functions and the like) can be used and that the mapping functions can be updated in response to the results of the mapping of stage 126.

The mapping can result in having mapped candidates within the gray gamut or outside the gray gamut. The weight assigned to each mapped candidates can be responsive to one or more parameters such as their location (inside the gray gamut, outside the gray gamut, outside the gray gamut but in proximity to the gray gamut), to the number of candidates associated with each color gamut, to the illumination, and the like.

The illumination can be estimated in various manners, including by looking at selected candidates of one or more colors, and especially looking at extreme candidates and estimating the illumination based upon the location of the extreme candidates.

Conveniently, the illumination is found by performing an average (conveniently a non-weighted average) of the different color candidates to provide a preliminary digital image imbalance estimation, and based upon the chromaticity value X' of that preliminary digital image imbalance estimation selecting the weights to be assigned to each color candidate.

Figure 5:
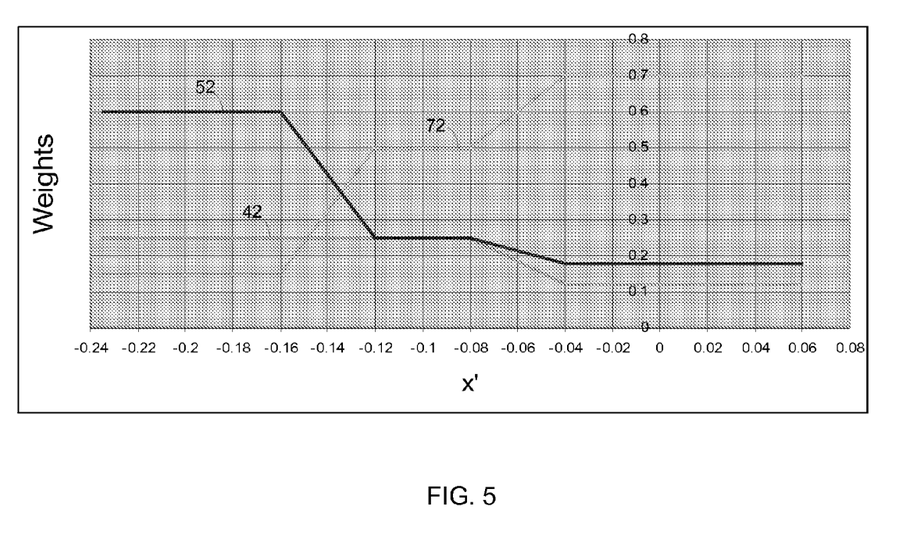
FIG. 5 illustrates different weights assigned to a green mapped candidate, to a yellow mapped candidate, and to a blue mapped candidate, according to an embodiment of the invention.

FIG. 5 illustrates different weights assigned to a green mapped candidate (graph 42) to a yellow mapped candidate (graph 72) and to a blue mapped candidate (graph 52), according to an embodiment of the invention. The weights are responsive to an X' value of the preliminary digital image imbalance estimation. The y-axis is a weight while the x-axis is the X' value.

A (non-preliminary) digital image imbalance estimation is the weighted sum of the different color mapped candidates.

Stage 147 includes calculating at least one white balance compensation parameter in response to the digital image imbalance estimation. The difference between the digital imbalance estimation and a target (for example a target that has equal R, G and B values) should be compensated by at least one white balance compensation parameter. For example, assuming that each of the target and the digital image imbalance estimations have a pair of chromaticity values then the difference between these pairs should be compensated by applying a Red color gain, a Blue color gain, and a Green color gain.

Stage 140 is followed by stage 150 of providing a compensated digital image by applying at least one white balance compensated parameter.

Figure 8:
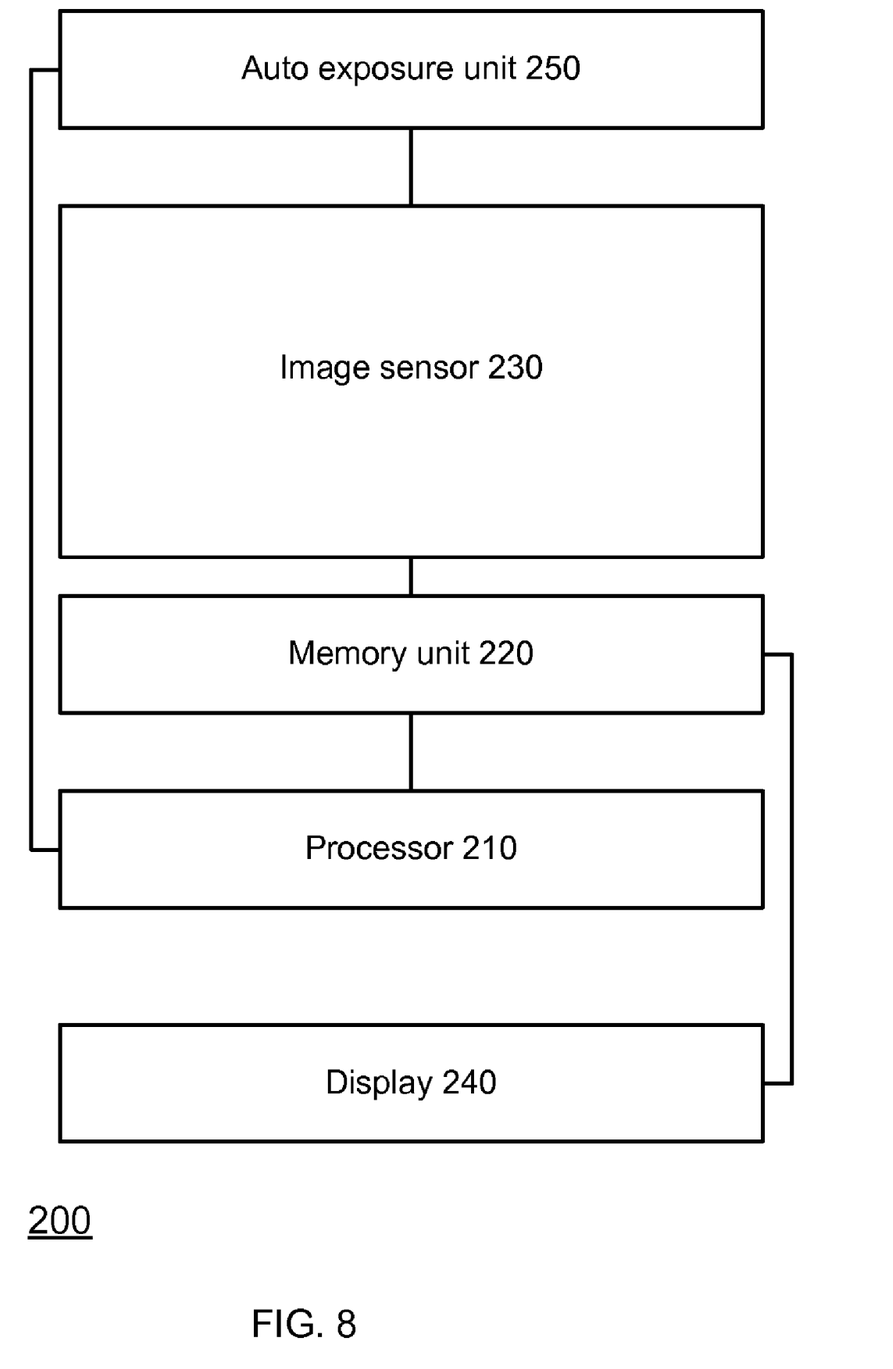
FIG. 8 illustrates a device according to an embodiment of the invention.

FIG. 8 illustrates device 200 according to an embodiment of the invention.

Device 200 has color gamut based white balancing capabilities. Device 200 includes processor 210 and memory unit 220.

FIG. 8 illustrates device 200 that is a camera and also includes image sensor 230, display 240, and auto exposure unit 250.

It is noted that device 200 can differ from a camera and can be, for example, a stand alone computer that receives images that are acquired by other devices, and generate a white balance compensated image. These white balance compensated image can be stored in device 200, can be displayed by device, and/or can be transmitted from device to another device, memory unit, or display.

Referring to FIG. 8, image sensor 230 acquires a digital image that is sent to memory unit 220. Processor 210 can process the digital image to provide a white balance compensated image. This white balance compensated image can be stored in memory unit 220, and/or displayed on display 240.

Auto exposure unit 250 can estimate an illumination condition, and this estimate can assist in the image acquisition process and even out the white balancing process. For example, this estimation can be used in the selection of selected candidates (filter out candidates that are located in color gamut portions of other illumination conditions), and when different color candidates are averaged to provide a preliminary digital image imbalance estimation.

Memory unit 220 stores the digital picture and can also store mapping coefficient, chromaticity value pairs, color gamut information, at least one white balance compensation parameter, and a white balance compensated image.

Processor 210 can execute various stages of method 100. For example, it can (when executing a code): (i) generate or receive multiple chromaticity value pairs of multiple pixel areas of the digital image; (ii) find selected candidates; wherein a selected candidate represents a pixel area and has a chromaticity value pair that falls within at least one color gamut out of a group of color gamut of different colors; wherein the different colors comprise at least one color that differs from gray; (iii) calculate at least one white balance compensation parameter in response to pixel information of pixels areas that have selected chromaticity values; and (iv) provide a white balance compensated image.

It is noted that a computer program product can be provided. It includes a tangible computer readable medium that stores code that once executed by a computer (such as processor 210 of device 200) causes the computer to: (i) generate or receive multiple chromaticity value pairs of multiple pixel areas of the digital image; (ii) find selected candidates; wherein a selected candidate represents a pixel area and has a chromaticity value pair that falls within at least one color gamut out of a group of color gamut of different colors; wherein the different colors comprise at least one color that differs from gray; (iii) calculate at least one white balance compensation parameter in response to pixel information of pixels areas that have selected chromaticity values; and (iv) provide a compensated digital image by applying at least one white balance compensated parameter.

The code can cause the computer to execute any stage of method 100 or a combination thereof.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention is described herein with reference to specific embodiments, various modifications and changes can be made without departing from the scope of the present invention as set forth in the claims below.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

I claim:

1. A method for performing a color based white balance of a digital image, the method comprises:

generating or receiving multiple candidates, wherein each candidate of the multiple candidates is an information unit that represents color information of a pixel area of the digital image, wherein each candidate has a chromaticity value pair;

finding a plurality of selected candidates out of the multiple candidates;

wherein each selected candidate represents a pixel area of the digital image and has a chromaticity value pair that falls within at least one color gamut out of a group of color gamut of different colors; wherein the different colors comprise at least one color that differs from gray;

wherein the plurality of selected candidates comprises (a) at least one selected candidate that falls within a gray color gamut and (b) at least one other selected candidate that falls within a second color gamut of a second color that differs from gray;

calculating a color candidate for each color gamut of the group of color gamut of different colors;

mapping at least one color candidate of at least one non-gray gamut onto the gray color gamut to provide at least one mapped candidate;

calculating at least one white balance compensation parameter in response to color information of pixels areas represented by the plurality of selected candidates and in response to the at least one mapped candidate; and providing a compensated digital image by applying the at least one white balance compensation parameter on the digital image.

2. The method according to claim 1 comprising calculating the at least one white balance compensation parameter in response to the at least one mapped candidate and to a gray candidate of the gray color gamut.

3. A method for performing a color based white balance of a digital image, the method comprises:
generating or receiving multiple candidates, wherein each candidate of the multiple candidates is an information unit that represents color information of a pixel area of the digital image, wherein each candidate has a chromaticity value pair;
finding a plurality of selected candidates out of the multiple candidates;
wherein each selected candidate represents a pixel area of the digital image and has a chromaticity value pair that falls within at least one color gamut out of a group of color gamut of different colors; wherein the different colors comprise at least one color that differs from gray;
wherein the plurality of selected candidates comprises (a) at least one selected candidate that falls within a gray color gamut and (b) at least one other selected candidate that falls within a second color gamut of a second color that differs from gray;
calculating at least one white balance compensation parameter in response to color information of pixels areas represented by the plurality of selected candidates; and
providing a compensated digital image by applying the at least one white balance compensation parameter on the digital image;
wherein the finding of the plurality of selected candidates comprises determining whether a chromaticity value pair of each candidate of the multiple candidates falls within the at least one color gamut out of the group of color gamut of different colors that are defined within a chromaticity space in which a black body line is horizontal.

4. A device having color gamut based white balancing capabilities, the device comprises a processor and a memory unit; wherein the memory unit stores the digital picture; wherein the processor is adapted to:
generate or receive multiple candidates, wherein each candidate of the multiple candidates is an information unit that represents color information of a pixel area of the digital image, wherein each candidate has a chromaticity value pair;
find a plurality of selected candidates out of the multiple candidates;
wherein each selected candidate represents a pixel area of the digital image and has a chromaticity value pair that falls within at least one color gamut out of a group of color gamut of different colors; wherein the different colors comprise at least one color that differs from gray;
wherein the plurality of selected candidates comprises (a) at least one selected candidate that falls within a gray color gamut and (b) at least one other selected candidate that falls within a second color gamut of a second color that differs from gray;
calculate at least one white balance compensation parameter in response to color information of pixels areas represented by the plurality of selected candidates; and
provide a compensated digital image by applying the at least one white balance compensation parameter on the digital image;
wherein the processor is arranged to find the plurality of selected candidates by determining whether a chromaticity value pair of each candidate of the multiple candidates falls within the at least one color gamut of the group of color gamut of different colors that are defined within a chromaticity space in which a black body line is horizontal.

5. The device according to claim 4 wherein the processor is further adapted to find a selected candidate that represents a pixel area of the digital image and has a chromaticity value pair that is proximate to a color gamut of the group of color gamut of different colors and falls outside the color gamut.

6. The device according to claim 4 wherein the processor is adapted to assign different weights to selected candidates that their chromaticity value pairs fall inside a color gamut of the group of color gamut of different colors and to selected candidates that their chromaticity value pairs are proximate to a color gamut of the group of color gamut of different colors and fall outside the color gamut.

7. The device according to claim 4 wherein the different colors comprise gray and at least one color that differs from gray.

8. The device according to claim 4 wherein the different colors comprise gray and at least two colors that differs from gray.

9. The device according to claim 4 wherein the different colors comprise gray and at least two colors out of a list consisting of skin tine, green and sky-blue.

10. The device according to claim 4 comprising calculating a color candidate for each color gamut, and providing at least one white balance compensation parameter in response to at least one color candidate.

11. The device according to claim 4 wherein the processor is adapted to calculate a color candidate for each color gamut, map at least one color candidate of at least one non-gray gamut onto a gray gamut to provide at least one mapped candidate; and provide at least one white balance compensation parameter in response to at least one mapped candidate.

12. The device according to claim 4 wherein the processor is adapted to calculate a color candidate for each color gamut, map at least one color candidate of at least one non-gray gamut onto a gray gamut to provide at least one mapped candidate; and provide at least one white balance compensation parameter in response to at least one mapped candidate and a gray candidate of the gray gamut.

13. The device according to claim 4 wherein the selected candidates comprise at least one selected candidate that falls within a gray color gamut and at least one other selected candidate that falls within a second color gamut of a second color that differs from gray.

14. A computer program product comprises a non-transitory computer readable medium that stores code that once executed by a computer cause the computer to:
generate or receive multiple candidates, wherein each candidate of the multiple candidates is an information unit that represents color information of a pixel area of the digital image, wherein each candidate has a chromaticity value pair;
find a plurality of selected candidates out of the multiple candidates;
wherein each selected candidate represents a pixel area of the digital image and has a chromaticity value pair that falls within at least one color gamut out of a group of color gamut of different colors; wherein the different colors comprise at least one color that differs from gray;
wherein the plurality of selected candidates comprises (a) at least one selected candidate that falls within a gray color gamut and (b) at least one other selected candidate that falls within a second color gamut of a second color that differs from gray;

calculate a color candidate for each color gamut of the group of color gamut of different colors;

map at least one color candidate of at least one non-gray gamut onto the gray color gamut to provide at least one mapped candidate;

calculate at least one white balance compensation parameter in response to color information of pixels areas represented by the plurality of selected candidates and in response to the at least one mapped candidate; and provide a compensated digital image by applying the at least one white balance compensation parameter on the digital image.

* * * * *